United States Patent [19]

Land et al.

[11] 4,096,492
[45] Jun. 20, 1978

[54] CAMERA WITH DETACHABLE ELECTRONIC FLASH UNIT AND EXPOSURE CONTROL SYSTEM THEREFOR

[75] Inventors: Edwin H. Land, Cambridge; Richard C. Kee, Chestnut Hill, both of Mass.

[73] Assignee: Polaroid Corporation, Cambridge, Mass.

[21] Appl. No.: 698,715

[22] Filed: Jun. 22, 1976

Related U.S. Application Data

[63] Continuation of Ser. No. 569,762, Apr. 21, 1975, abandoned.

[51] Int. Cl.$^2$ .............................................. G03B 7/16
[52] U.S. Cl. ...................................... 354/33; 354/34; 354/35; 354/27; 354/60 F; 354/127; 354/139; 354/149
[58] Field of Search ................... 354/23 D, 27, 32, 33, 354/34, 35, 60 F, 127, 128, 133, 139, 145, 149; 315/241 P

[56] References Cited

U.S. PATENT DOCUMENTS

| | | | |
|---|---|---|---|
| 3,316,445 | 4/1967 | Ahrons | 354/145 |
| 3,439,597 | 4/1969 | Wagner | 354/139 |
| 3,917,395 | 11/1975 | Ogawa | 354/23 D |
| 3,953,864 | 4/1976 | Iwata et al. | 354/27 |
| 3,997,815 | 12/1976 | Decker | 354/128 X |
| 4,001,640 | 1/1977 | Biber | 354/145 X |

*Primary Examiner*—L. T. Hix
*Assistant Examiner*—William B. Perkey
*Attorney, Agent, or Firm*—David R. Thornton

[57] ABSTRACT

A camera with a detachable electronic flash unit. The camera includes apparatus effective when the flash unit is detached for making an automatically controlled exposure under ambient light conditions. When the flash unit is attached, the ambient exposure control system is disabled and operation of the camera is inhibited until charging of the flash unit is initiated by pressing a button. When the flash unit is charged, the camera is enabled to make a flash exposure by triggering the flash unit, during an interval of time in which the light output of the electronic flash unit is regulated so that a uniform flash of light will be produced when the shutter is actuated.

5 Claims, 4 Drawing Figures

CAMERA WITH DETACHABLE ELECTRONIC FLASH UNIT AND EXPOSURE CONTROL SYSTEM THEREFOR

CROSS REFERENCE TO RELATED APPLICATIONS

This is a continuation of application Ser. No. 569,762, filed Apr. 21, 1975, now abandoned.

This invention relates to photography, and particularly to a camera with a detachable electronic flash unit and a novel exposure control system therefor.

The art of photography has advanced in the direction of progressively more automatic camera operation. Cameras are now available with which, at the touch of a button, the proper exposure is automatically computed and made upon a film unit, and the exposed film unit is then processed to deliver a finished print to the photographer immediately thereafter. Such cameras are disclosed, for example, in U.S. Pat. No. 3,641,889 to Viato K. Eloranta, issued on Feb. 15, 1972 for Exposure Control System, and in U.S. Pat. No. 3,846,812, issued on Nov. 5, 1974 to Conrad H. Biber, for Automatic Electronic Flash Camera.

In the latter patent, an electronic flash circuit is disclosed which operates with power supplied by a battery contained in a cassette that also contains film units for exposure in the camera. In order to conserve battery power, the camera includes means for inhibiting the charging of the flash circuit during operation of other power consuming elements of the camera.

Another circuit for conserving power in a camera using an electronic flash unit is shown and described in U.S. Application for Letters Patent Ser. No. 501,503, now U.S. Pat. No. 4,001,640, filed on Aug. 29, 1973 by Conrad H. Biber for Single Trigger Photographic Strobe Unit, and assigned to the assignee of this application. That application discloses a flash unit which is charged only when a pushbutton is depressed, and which remains charged until the unit is triggered to produce a light flash, or until a predetermined time interval has elapsed, and is then turned off.

The Polaroid SX-70 Land Camera, made and sold by Polaroid Corporation of Cambridge, Massachusetts, is a particular example of the state of the art of photographic automation. In the form currently manufactured, the camera is particularly adapted for use with a flash array, such as shown and described in copending U.S. Application for Letters Patent Ser. No. 482,379, now U.S. Pat. No. 4,005,449 filed on June 24, 1974 by Seymour Ellin for Flash Photographic System With Camera Inhibit Feature, and assigned to the assignee of this application.

Flash arrays of the kind suited for use in the Polaroid SX-70 Land Camera each comprise two banks of five flash lamps each. The apparatus shown in the above cited application Ser. No. 482,379, comprises circuit means for testing the flash lamps in that bank facing the scene to be photographed and firing the first one which has not been fired in that bank when the shutter is operated. When the last flash lamp in the bank facing the scene has been expended, apparatus is provided for inhibiting further operation of the camera. The control circuits for this purpose are necessarily somewhat complex and costly. And the unit cost of flash lamps considerably exceeds the unit cost of electronic flash exposures when large numbers of pictures are taken.

The objects of this invention are to provide a simplified camera and electronic flash system with which accurate exposures can be made either by flash or daylight, and in which the circuits required in the camera are simplified so that the cost and complexity of the camera can be reduced.

Briefly, the above and other objects of the invention attained by the construction of a novel electronic flash unit, which, in its external aspects, comprises five external terminals that are to be connected to corresponding terminals of the camera, a manually operable pushbutton, the usual ready light, and a conventional gas discharge tube in a reflector.

The external terminals of the electronic flash unit comprise two terminals adapted to be connected to an external battery, particularly to a battery located in the camera. A third terminal provides a signal to the camera when it is installed on the camera indicating that the unit is in place. The fourth of the external terminals supplies a camera inhibit signal to the camera when it is on the camera, under conditions and in a manner to be described. The fifth terminal receives a trigger signal produced at times by the camera to cause the flash unit to be triggered and produce a flash of light.

The external pushbutton on the flash unit operates when momentarily depressed to cause the flash unit to begin to charge when the unit is on the camera and power is supplied to the power input terminals. Depressing of the pushbutton initiates a circuit action which causes the flash unit to be charged continuously until it is sufficiently charged to produce a proper exposure, at which time a ready light in the unit will begin to glow.

At the time that the ready light begins to glow, or shortly after that time, a regulator circuit will be activated to maintain the charge on the main storage capacitor within predetermined limits, by turning the charging circuit on and off. When this circuit begins to function, a timer is actuated.

If, during the interval of operation of the timer, the operator uses the camera shutter button to initiate an exposure, the flash unit will be triggered and the charging circuit will be cut off. If the operator does not initiate an exposure in this manner during the interval of the timer's operation, at the end of that interval the charging circuit will again be interrupted and the inhibit signal will be presented to the camera.

The camera may be of any conventional construction except in the particular sockets to be described. In particular, terminals adapted to be connected to the corresponding terminals of the flash unit must be provided. The camera is further provided with internal circuits, to be described, to modify the mode of operation from an ambient mode, in which a daylight exposure is made and the extent of the exposure is determined by a photocell, to a flash mode, in which the flash is triggered at a predetermined aperture of the shutter as it opens.

When the flash unit is removed from the camera, the camera functions as a conventional automatic daylight exposure camera with very few additional components other than those needed for that purpose. When the flash unit is inserted in the camera, operation of the camera is inhibited until the flash circuit has been charged by depressing the pushbutton, and until the charged level has reached the predetermined value at which a proper exposure will be made at the predetermined camera aperture, which depends on the focus and distance in a manner to be described.

The manner in which the apparatus of the invention is constructed, and its mode of operation, will best be understood in the light of the following detailed description, together with the accompanying drawings, of an illustrative embodiment thereof.

In the Drawings

Figures 1, 2, 3:
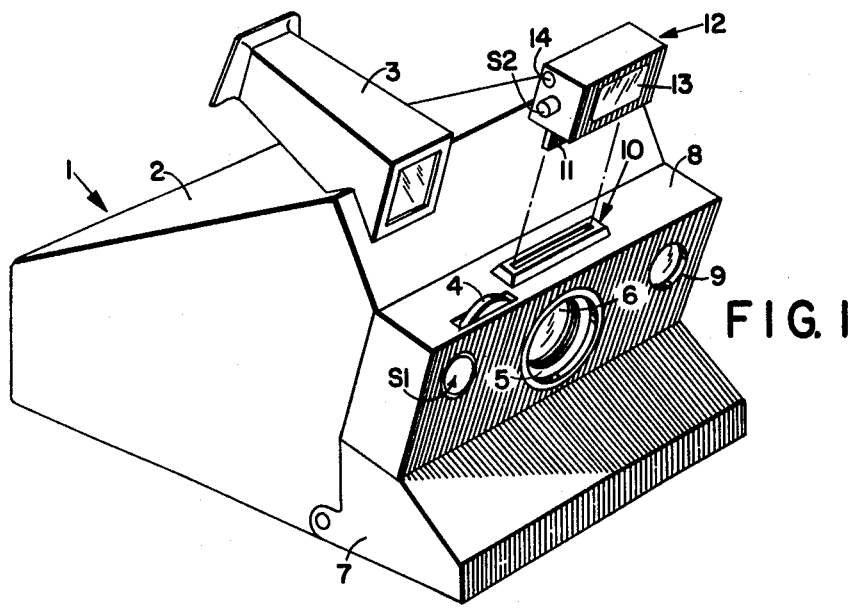
FIG. 1 is a schematic perspective exploded sketch showing a camera and electronic flash unit in accordance with the invention.
FIG. 2 is a schematic elevational sketch of a shutter mechanism of a form suitable for use in the camera of FIG. 1.
FIG. 3 is a schematic block and wiring diagram of the portion of the camera circuit of FIG. 1 required to control exposure in accordance with the invention.

Referring first to FIG. 1, there is shown a camera generally designated 1 which may be of any conventional variety, except as especially constructed in the respects to be noted below. In particular, the camera may be similar to that shown and described in U.S. Pat. No. 3,672,281, issued on June 27, 1972 to Edwin H. Land for reflex camera, except that for purposes of simplicity of description here, it is to be assumed to have a fixed taking mirror located inside of a top panel 2, and without a movable mirror for through-the-lens viewing. Alternatively, the camera could be provided with a moving mirror for through-the-lens viewing as described in the cited U.S. Pat. No. 3,672,281.

The exact form of the camera, the manner in which it is loaded, the nature of the photosensitive material used, and the manner in which it is processed is beyond the scope of this invention, and the conventional parts of the camera shown for purposes of explaining the operation of the invention are chosen more for simplicity of exposition than to indicate any particular preference. As one example of this choice, the camera shown is provided with a conventional view finder 3 through which a scene to be photographed may be viewed and framed, and a focusing knob 4 which can cooperate with a focusing scale, not shown, either adjacent the knob 4, or on a rotating part of the lens barrel 5 in which the lens 6 is mounted.

The camera 1 is indicated as provided with a hinged forward bed portion 7 to facilitate loading and unloading in any conventional manner. On a lens board and shutter-housing 8, in which the lens 6 and focusing knob 4 are mounted, there is a shutter button generally designated S1, and a window 9, through which a photocell 37, to be described, is exposed. On top of the lens board 8 there is a socket generally designated 10 adapted to receive a blade 11 formed on the bottom of an electronic flash unit generally designated 12.

As briefly described above, the electronic flash unit 12 has a transparent front window or lens 13 behind which a reflector, and a flash tube in the reflector, of any conventional design are arranged. An externally accessible push button S2 is shown at the side of the unit 12. A window 14 through which a ready light, to be described, can be seen when it is illuminated, is shown at the side of the unit 12 for convenience, though it would preferably be located at the rear.

The lens 6 is preferably of the type in which focusng is accomplished by movement of the front element of the lens 6. The front element of the lens is attached to the barrel 5 in a conventional manner, the barrel 5 being provided with screw threads for advancement or retraction to focus the lens. To accomplish focusing for this purpose, as shown in FIG. 2, teeth 15 formed on the focusing knob 4 mesh with corresponding teeth 16 formed on the barrel 5.

The teeth 16 also mesh with teeth 17 formed on a rack 18 that is guided for lateral movement, as by a guide means indicated at 19 in FIG. 2. Carried on the rack 18 is a magnetic reed switch S3 which is adapted to be closed at times by a small permanent magnet 20 mounted on one of a pair of shutter blades 21 and 22. The shutter blades are guided for lateral movement in FIG. 2 by conventional means not shown, and are connected to opposite ends of a walking beam 23.

As indicated in FIG. 2, the left end 24 of the shutter blade 21 is pivoted to the upper end of the walking beam 23, and the lower left hand end 25 of the shutter blade 22 is similarly pinned to the lower end of the walking beam 23. The walking beam 23 is centrally pivoted to a suitable support 26, as schematically indicated in FIG. 2.

The shutter blade 21 is provided with a tear-shaped aperture 27, and the shutter blade 22 is formed with a corresponding oppositely directed tear-shaped aperture 28. These apertures are out of registry in the position of the parts shown, so that the path through the lens is closed. The shutter blades 21 and 22 are normally held in this closed position by a spring 30 which is connected between the upper end of the walking beam 23 and the frame of the camera, as suggested at 31.

A solenoid having a winding 32 is energized at times to attract an armature schematically indicated at 33 to rotate the walking beam 23 clockwise as seen in FIG. 2, causing the shutter apertures 27 and 28 to move together, and thus progressively provide a larger and larger aperture through which the scene to be photographed is exposed.

Corresponding apertures 35, in the shutter blade 21, and 36, in the shutter blade 22, progressively expose a photocell schematically indicated at 37 as the shutter blade apertures progressively open to increase the aperture through the lens. This construction is well known per se, and need not be furthered described.

As the shutter opens under the influence of the solenoid 32, at a position of the blades determined by the focused position of the focusing knob 4, the switch S3 will be closed by the magnet 20. Closing the switch S3 causes a triggering signal to be produced, in a manner next to be described.

The solenoid 32 has an energizing circuit completed at times from a supply terminal at B+ through the load terminals of a conventional electronic switch S4 that is closed when a positive signal with respect to ground, labelled OPEN, is applied to its control terminal. In connection with the description of this signal, as well as others to follow, the labelled signal is considered present, or at a truth value of logic 1, when it is positive with respect to ground, and may be considered to be at ground potential when it is not present. A barrel label indicates that the labelled signal is positive when the labelled condition is not present, with the exception of the signal $\overline{\text{INHIBIT}}$, to be described, which is an open circuit when INHIBIT is absent, and at ground potential when INHIBIT is present.

In FIG. 3, the pertinent exposure control circuits for the camera of FIG. 1 will next be described. As indicated, the camera has five externally accessible terminals, 40, 41, 42, 43 and 44, located in the socket 10 in FIG. 1 and arranged to mate with corresponding contacts formed on the blade 11 of the flash unit 12, as will be described below.

The camera 1 is provided with a conventional battery 45, which may be located in a suitable compartment in the camera for that purpose, or may be supplied in a cassette with film units for the camera, as in the case of the Polaroid SX-70 Land film pack. When so installed in either fashion, the negative terminal of the battery is connected to a reference terminal labelled ground, and the positive terminal is connected to the external terminal 41, as well as other needed terminals, in part to be described, and as will otherwise be understood by those skilled in the art. Other points in the circuit where a connection to this positive terminal is explicitly shown are labelled B+. The external terminal 40 is connected to ground.

The external terminal 42 is connected to one input terminal of a conventional AND gate 46. A second input terminal of the AND gate 46 is connected to the active output terminal of a conventional one shot multivibrator 47.

The active input terminal of the multivibrator 47 is connected over the contacts of the normally open switch S3 to ground. When the switch S3 is closed, during the operation of the shutter as described above, the multivibrator 47 is triggered to produce a positive output pulse. In the presence of a logic 1 signal labelled STROBE on the terminal 42, the AND gate 46 will then produce a logic 1 pulse labelled TR.

The pulse TR is applied to the external terminal 44, and serves to trigger the flash unit 12 in a manner to be described. The pulse TR also produces a shutter closing signal, as will appear.

The external terminal 43 supplies a signal labelled $\overline{INHIBIT}$ that is an open circuit when the condition INHIBIT is present. When an INHIBIT signal is produced by the electronic flash unit, in a manner to be described, the signal $\overline{INHIBIT}$ is removed, and a ground level current sink is supplied.

As shown in FIG. 3, the shutter button S1 may be a conventional spring-returned pushbutton having one contact connected to the supply terminal at B+. A second contact of the pushbutton S1 is returned to ground through a circuit extending through a first resistor 48, from the cathode to the anode of a conventional zener diode 49, and thence through a fixed resistor 50 to ground.

The junction of the resistor 50 and the anode of the zener diode 49 is connected to the active input terminal of a conventional one-shot multivibrator 51. The multivibrator 51 is arranged to produce a positive pulse, labelled EXPOSE, in response to a positive-going transition across the resistor 50. Such a transition is produced at times when the switch S1 is closed, the signal $\overline{INHIBIT}$ is present, and the closing of the switch S1 accordingly causes the zener diode 49 to break down, causing current to flow through the resistors 48 and 50 and thus triggering the multivibrator 51 to produce the EXPOSE pulse.

The EXPOSE pulse is applied to the set input terminal of a conventional flip-flop 52. When set, a logic 1 signal labelled OPEN appears at the logic 1 output terminal of the flip-flop 52, and serves to close the switch S4 to energize the winding of the shutter-operating solenoid 32 as described above.

The flip-flop 52 is to be arranged to be reset when a logic 1 signal appears at the output terminal of a conventional OR gate 53. The gate 53 has three input terminals, each receiving a different one of these signals RESET, EE and TR.

The signal TR is produced as described above by the AND gate 46. The signal EE is produced in a manner to be described below. The signal RESET is produced when the battery 45 is first connected in the circuit, by a circuit extending from the battery terminal at B+ through capacitor 54 to one input terminal of the gate 53.

An exposure control circuit for ambient light pictures extends from the supply terminal at B+ over the load terminals of a conventional electronic switch S5, through the resistive element of the photocell 37, and through a timing capacitor 55 to ground. The electronic switch S5 is closed when the signal labelled OPEN is applied to its control terminal.

A conventional electronic switch S6 has its load terminals connected across the capacitor 55, so that the capacitor is shunted when the switch S6 is closed. The switch S6 is closed at times by a logic 1 signal appearing at the output terminal of a conventional OR gate 57. The gate 57 has two input terminals, one receiving the signal STROBE at times produced on the external terminal 42. The other terminal receives the level $\overline{OPEN}$ that is present when the flip-flop 52 is in its reset state.

The junction of the capacitor 55 and the resistive element of the photocell 37 is connected to the active input terminal of a conventional Schmitt trigger circuit 58. The Schmitt trigger 58 responded to a predetermined level of voltage across the capacitor 55 to produce an output signal transition that triggers a conventional one-shot multivibrator 59. When triggered, the multivibrator 59 produces a positive signal labelled EE that causes the flip-flop 52 to be reset through the OR gate 53.

The operation of the camera of FIGS. 1 through 3, in the absence of the electronic flash unit 12, will next be described. Assume that the camera is loaded with film in a conventional manner, and the battery 45 is present, so that the flip-flop 52 has been reset by the RESET pulse supplied through the OR gate 53.

Next, assume that the camera has been focused, by rotation of the knob 4 to properly position the switch S3 in FIG. 3, and that the camera is next aimed and framed, and an exposure initiated by momentarily depressing the shutter button S1.

In the presence of the open circuit signal labelled $\overline{INHIBIT}$, the closure of the switch S1 will cause the multivibrator 51 to be triggered and produce the EXPOSE pulse, setting the flip-flop 52. That will produce the signal OPEN, closing the switches S4 and S5 and energizing the solenoid 32 to cause the shutter to begin to open.

At the same time, in the absence of both the signals STROBE and $\overline{OPEN}$, the switch S6 will be open. The capacitor 55 will begin to charge through the photocell 37 at the rate determined by the level of ambient light.

At sometime during the opening of the shutter, the switch S3 may be closed to trigger the one-shot multivibrator 47, producing an output pulse that is applied to one input terminal of the AND gate 46. However, in the absence of the level STROBE on the terminal 42, no effect will be produced by this pulse.

When a sufficient amount of light has been passed through the lens 6 to properly expose the film, the voltage across the capacitor 55 will be sufficient to cause the Schmitt trigger 58 to be triggered, triggering the multivibrator 59 to produce the output pulse labelled EE. The pulse EE resets the flip-flop 52 through the OR gate 53, and the apparatus is restored to its initial condition. The film is then changed in any conventional manner, and the camera is ready for the next exposure.

Figure 4:
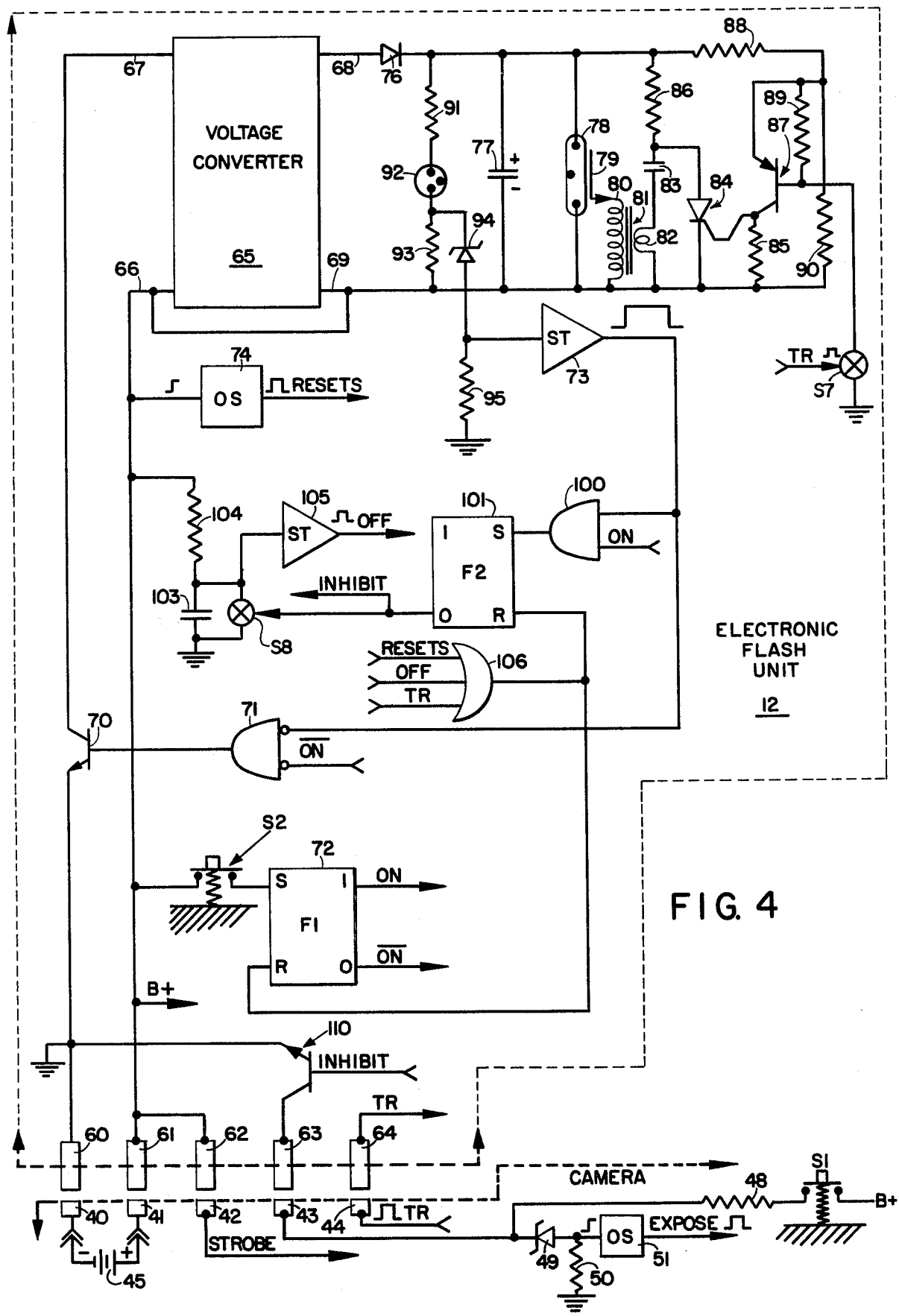
FIG. 4 is a schematic block and wiring diagram of the electronic flash unit and its interface with the camera circuits.

Referring now to FIG. 4, the electronic flash unit 12 will next be described. The flash unit 12 is provided with five external terminals 60, 61, 62, 63 and 64, physically mounted on the blade 11 as described above in connection with FIG. 1, and adapted to engage the corresponding contacts 40, 41, 42, 43 and 44 of the camera.

The terminal 60 is connected to the reference terminal referred to as ground, and is at the same potential as the ground terminal in the camera circuit of FIG. 3 when the strobe unit is connected to the camera and the battery 45 is in place. The terminal 61 is adapted to engage the camera terminal 41, and supply the potential B+ to the flash unit. The terminal 61 is also connected to a terminal 62 that is adapted to engage the camera terminal 42, and thus supply a B+ signal labelled STROBE to the camera when the flash unit is installed.

The external terminal 63 of the strobe unit is adapted to engage the terminal 43 of the camera, and to supply either an open circuit signal, labelled $\overline{INHIBIT}$ in FIG. 3, or a ground level signal, depending on the operation of circuits to be described. The external terminal 64 of the strobe unit receives the signal TR, produced at times on the terminal 44 in the manner described above in connection with FIG. 3.

As shown in FIG. 4, the electronic flash unit 12 further comprises a conventional voltage converter 65 of any conventional design, which serves to transform the relatively low voltage B+, such as 6 volts, to a high pulsating voltage, for example, at 350 volts. The process, as is well known, essentially involves converting the DC voltage to AC, producing a high voltage with the aid of a transformer, and rectifying the high voltage AC to produce a DC voltage of a desired potential.

As shown, the voltage converter 65 has input terminals 66 and 67, and output terminals 68 and 69. The input terminal 66 is common with the output terminal 69.

The input terminal 66 receives the camera supply voltage at B+ when the flash unit is on the camera. The input terminal 67 is connected to the collector of a conventional NPN power transistor 70.

The emitter of the transistor 70 is connected to ground, and to the external terminal 60. The base of the transistor 70 is connected to the active output terminal of a conventional NOR gate 71.

The gate 71 has two input terminals, one receiving a level labelled $\overline{ON}$ that is present when a flip-flop 72 is reset, and a second input terminal receiving a positive signal at times produced at the output terminal of a conventional Schmitt trigger circuit 73. When the electronic flash unit 12 is first connected to the camera, the rising potential produced on the input lead 66 triggers a conventional one-shot multivibrator 74 to produce a positive pulse, labelled RESETS to distinguish it from the RESET signal produced in the camera. This pulse is used to reset the apparatus in a manner to be described.

At times when the gate 71 produces a logic 1 output signal to bias the transistor 70 into conduction, current is supplied to the voltage converter 65 to produce high voltage pulses on the output terminals 68 and 79. These pulses are rectified by a conventional diode 76 to supply charging current to a main storage capacitor 77, which may be, for example, a 600 microfarad capacitor.

The electronic flash unit 12 comprises a conventional light-emitting gas discharge tube 78 that has anodes connected across the terminals of the capacitor 77. The tube 78 is provided with a triggering grid 79 that is connected to one terminal of the high voltage secondary winding 80 of a pulse transformer generally designated 81. The other terminal of the winding 80 is connected to the lead 69.

The low voltage primary winding 82 of the pulse transformer 81 has one terminal connected to the terminal 69, and another terminal connected through a capacitor 83 to the anode of a conventional silicon controlled rectifier 84. The cathode of the controlled rectifier 84 is returned to the lead 69.

The gate terminal of the controlled rectifier 84 is returned to the lead 69 through a fixed resistor 85. The anode of the controlled rectifier 84 is returned to the cathode of the diode 76 through a current limiting resistor 86.

The gate terminal of the silicon controlled rectifier 84 is connected to the collector of a conventional PNP transistor 87. The emitter of the transistor 87 is connected through a voltage dropping resistor 88 to the cathode of the diode 76.

The emitter of the transistor 87 is connected to the base of the transistor 87 through a biasing resistor 89. The emitter of the transistor 87 is also returned to the terminal 69 through a fixed resistor 90 which serves to provide a suitable operating potential for the transistor 87.

The base of the transistor 87 is returned to ground over the load terminals of a conventional electronic switch S7, which may be a transistor or the like. The switch S7 is closed when the positive pulse labelled TR is applied to its control terminal.

A charge level indicating and detecting circuit extends from the cathode of the diode 76 through a current limiting resistor 91 and thence through a ready light 92, which may be a conventional neon gas discharge tube, and thence through a relatively small fixed resistor 93 to the lead 69. The junction of the resistor 93 and the discharge tube 92 is connected to the cathode of a conventional zener diode 94. The anode of the zener diode 94 is returned to ground through a fixed resistor 95.

The junction of the zener diode 94 and the resistor 95 is connected to the active input terminal of a conventional Schmitt trigger circuit 73. The Schmitt trigger circuit 73 may be arranged to produce an output voltage transition from ground to a fixed positive value when the voltage across the resistor 95 is at or above a predetermined level, and to switch back to an output ground signal when the voltage across the resistor 95 is equal to or below a second lower value than the first value. These switching values are preferably somewhat above the voltage at which the ready light 92 goes into conduction and produces an indication that the flash unit is charged.

The active output terminal of the Schmitt trigger circuit 73 is connected to one input terminal of the NOR gate 71 as described above, and is also connected to one input terminal of a conventional AND gate 100. A second input terminal of the gate 100 receives the signal ON, produced when the flip-flop 72 is set.

When the gate 100 produces a logic 1 output signal, the flip-flop 101 is set. Setting the flip-flop 101 removes a logic 1 signal labelled INHIBIT from its logic zero output terminal. The INHIBIT signal is applied to the control terminal of a conventional electronic switch S8, which has its load terminals connected across the terminals of a storage capacitor 103.

A timing circuit extends from the supply terminal 66 through a fixed resistor 104 and the capacitor 103 to ground. When the switch S8 is opened in the absence of the INHIBIT signal, the capacitor 103 is slowly charged through the resistor 104.

At a predetermined value of the voltage across the capacitor 103, a Schmitt trigger circuit 150 produces a positive going transition to a level labelled OFF. When the OFF signal is present at logic 1, the flip-flop 101 will be reset through a conventional OR gate 106. For this purpose, the OFF signal is supplied to one input terminal of the gate 106. Two other input terminals of the OR gate 106 receive the signals RESETS and TR, produced as described above.

When the flip-flop 101 is reset by the OFF signal, the level INHIBIT is produced to close the switch S8, discharging the capacitor 103 and thus triggering the Schmitt trigger circuit 105 to terminate the OFF pulse.

Comparing FIGS. 1 and 4, the external manually operable switch S2 may take the form of a conventional spring-returned pushbutton connected between the lead 66 and the set input terminal of the flip-flop 72 (FIG. 4). The flip-flop 72 is thus set, to produce the signal ON and to remove the signal $\overline{ON}$ when the pushbutton S2 is momentarily depressed. The flip-flop 72 is arranged to be reset by the gate 106.

The signal INHIBIT is supplied to the base of a conventional NPN transistor 110. The emitter of the transistor 110 is connected to ground, and the collector of the transistor 110 is connected to the flash unit terminal 63, to supply an inhibiting ground level signal to the camera terminal 43 when the transistor 110 is gated into conduction by the presence of the level INHIBIT.

Having described the construction of the apparatus of the invention, the operation of the system with the electronic flash unit 12 in place will next be described. The assumption will be made that the battery 45 is in place, and that the flash unit is installed on the camera, so that the flip-flop 52 in FIG. 3 has been reset through the gate 53, and the flip-flops 72 and 101 in FIG. 4 have been reset through the gate 106.

The signal INHIBIT will be produced at the logic 0 output terminal of the flip-flop 101, closing the switch S8 to prevent charging of the capacitor 103, and biasing the transistor 110 into conduction to supply an inhibiting level essentially at ground potential to the terminal 63 of the strobe flash unit and thence to the terminal 43 of the camera. As indicated in FIG. 4, with the transistor 110 conducting, should the switch S1 be depressed, no camera operation will follow because the voltage at the cathode of the zener diode 49 cannot rise high enough to break down the diode 49 and trigger the one shot multivibrator 51.

The signal STROBE will be present at terminal 42 of the camera. Referring to FIG. 3, the STROBE signal will enable the gate 46 to respond, at such time as the shutter opens sufficiently to close the switch S3. However, the shutter cannot be opened at this time because the shutter button S1 is inhibited.

With the flip-flops 72 and 101 reset, the signal $\overline{ON}$ applied to one input terminal of the NOR gate 71 will cause the transistor 70 to be cut off, so that the electronic flash unit will not be charged. The apparatus will remain in this condition, with the camera inhibited and the flash unit discharged, until the pushbutton S2 is momentarily depressed. When that occurs, the flip-flop 72 will be set to produce the signal ON. That will remove the signal $\overline{ON}$ from the gate 71, and, in the absence of a high output signal from the Schmitt trigger circuit 73, the gate 71 will produce a logic 1 output signal to gate transistor 70 into saturation conduction, supplying charging current to the voltage converter 65. The voltage converter 65 will then produce high voltage pulses on the lead 68, which will be rectified by the diode 76 and charge the capacitors 77 and 83.

Nothing further will occur until the ready light 92 discharges, whereupon the level of voltage across the resistor 93 will rise above B+ by a sufficient amount to break the diode 94 down and cause current to flow through the resistor 95. At a predetermined level of voltage across the resistor 95, the Schmitt trigger 73 will be triggered to produce a high output signal. This signal, with the flip-flop 72 reset and the level ON present, will set the flip-flop 101 through the gate 100, and will also disable the gate 71 so that the transistor 70 will be cut off, stopping the charging of the flash unit.

With the flip-flop 101 now set, the level INHIBIT is removed and the switch S8 is opened, causing the capacitor 103 to begin to charge. The time constant of the capacitor 103 and the resistor 104 is selected to produce a relatively long interval, such as from 30 seconds to one minute, before the Schmitt trigger 105 is triggered. During this interval, the ready light will continue to glow, and the output of the Schmitt trigger circuit 73 will remain high, until sufficient charge leaks off the capacitor 77 to cause the voltage across the resistor 95 to fall to the value at which the Schmitt trigger 73 will switch back to produce a low output signal. When that occurs, the gate 71 will again be enabled to turn on the transistor 70, resuming charging until the Schmitt trigger 73 switches again.

During the fully charged interval before the Schmitt trigger 105 responds, the absence of the signal INHIBIT from the base of the transistor 110 will cut off the transistor 110, causing an open circuit potential to be presented to the terminal 63 of the flash unit, and thence to terminal 43 of the camera. If the switch S1 is then depressed, the one shot multivibrator 51 in FIG. 3 will be triggered to produce an EXPOSE pulse.

The EXPOSE pulse will set the flip-flop 52 as before, to produce the OPEN signal that will close the switch S4 and energize the shutter solenoid 32 to begin opening the shutter. At the position of the shutter blades set by the focus knob 4, the magnet 20 will close the switch S3, causing the multivibrator 47 in FIG. 3 to produce its output pulse.

In the presence of the signal STROBE at the second input terminal of the gate 46, its signal TR will now be produced. The signal TR will act through the OR gate 53 to reset the flip-flop 52, removing the level OPEN and causing the switch S4 to open and de-energize the solenoid 32, to cause the shutter to begin to close under the influence of the spring 30 in FIG. 2.

When the shutter was first opened by setting the flip-flop 52, the switch S5 in FIG. 3 was closed. However, since the signal STROBE was present at the input terminal of the OR gate 57, the switch S6 remained closed, preventing the capacitor 55 from charging. Accordingly, the signal EE would not be produced during a flash exposure cycle.

Referring again to FIG. 4, when the pulse TR is produced, the switch S7 is momentarily closed. That causes the base of the transistor 87 to be brought down in potential with respect to its emitter, gating the transistor into conduction and supplying current through the resistor 85. The potential across the resistor 85 produced in this way causes gate current to flow to the control gate of the controlled rectifier 84, switching it into conduction and abruptly discharging the capacitor 83 through the load terminals of the controlled rectifier 84 and the low voltage winding 82 of the pulse transformer 81.

An abrupt pulse of high voltage, such as 5000 volts, is now applied to the grid 79 of the tube 78, causing it to break down and discharge to produce a flash of light, with the energy supplied by the discharge of the capacitor 77 through the tube 78. This operation is timed to occur with the shutter opening at an aperture which is appropriate to the focused distance. The flash time may be quite short, for example, 1 millisecond, compared with the minimum rate of opening and closing the shutter blades, which may be, for example, from 5 to 10 milliseconds, so that the flash can easily be produced at the proper average aperture even though the command to close the shutter is given at the same time that the strobe unit is triggered.

When the pulse TR is produced as described above, both of the flip-flops 72 and 101 in FIG. 4 will be reset by the OR gate 106. With the flip-flop 101 reset, the sinal INHIBIT will again be present, interrupting the charging of the capacitor 103 and inhibiting operation of the camera by the shutter button S1 in FIGS. 3 and 4. The system will remain in that state until the pushbutton S2 is again depressed.

Assuming that the strobe button S2 is depressed to initiate a charging cycle as described above, and that the shutterbutton S1 is not actuated after the INHIBIT signal is removed, the capacitor 103 in FIG. 4 will continue to charge until the Schmitt trigger 105 is switched to produce the OFF pulse. The OFF pulse will reset the flip-flops 72 and 101 through the gate 106 as described above, again returning the apparatus to its standby condition until the pushbutton S2 is again depressed. There will remain a residual charge on the capacitor 77 during this time, but the voltage regulator circuit controlled by the Schmitt trigger 73 will not function after the apparatus has been reset, because the gate 71 will be disabled in the presence of the signal $\overline{ON}$ produced by the flip-flop 72 in its reset state. The residual charge on the capacitor 77 will be gradually dissipated, but it will not be available for exposure. This is desirable, because the level will gradually deteriorate, so that the light level might no longer be appropriate for the aperture selected by the switch S3 if the flash were discharged after regulation was ended.

While the invention has been described with respect to the details of a particular embodiment thereof, many changes and variations will occur to those skilled in the art upon reading this description, and such can obviously be made without departing from the scope of the invention.

We claim:

1. An electronic flash unit for use with a camera and a supply of electrical power, the camera having selectively operative means for producing a film exposure, means responsive to an inhibit signal for precluding operation of said selectively operative means, and means for producing a flash trigger signal, said flash unit comprising:

flash means for storing an electrical charge and, in response to said flash trigger signal, for subsequently producing a flash of light;

actuatable means for producing a first signal;

a first switch device settable from a first to a second state responsive to said first signal and resettable to its said first state responsive to said flash trigger signal;

means responsive to said first switch device being in its said second state for coupling said flash means to said power supply so as to store said electrical charge and responsive to said first switch device being in its said first state for decoupling said flash means from said power supply;

charge sensing means for producing a second signal responsive to said flash means being charged to a given level;

means responsive to said second signal and said switch device being in its said second state for producing a third signal; and a second switch device settable from a first to a second state responsive to said third signal and resettable to its said first state responsive to said flash trigger signal, said second switch device providing said inhibit signal when said second switch device is in its said first state and terminating said inhibit signal when said second switch device is in its said second state whereby in response to said trigger signal, both said switch devices are reset to their said first states so as to automatically prevent further storing of said charge and operation of said selectively operative means when said flash of light is produced.

2. The unit of claim 1 wherein said first switch device is a first register and said second switch device is a second register.

3. The unit of claim 2 wherein said charge sensing means includes charge maintaining means for maintaining said charge at or above said predetermined level, and further including a timing circuit automatically energizeable in the absence of said inhibit signal for terminating operation of said charge maintaining means.

4. An electronic flash and camera system for use with a supply of electrical power, said system comprising flash means for storing an electrical charge and, responsive to a given trigger signal, for producing a flash or light, selectively operable means for producing a flash charge signal, a first switch device settable from a first to a second state responsive to said selectively operable means and resettable to its said first state responsive to said trigger signal, means responsive to said first switch device being in its said second state for coupling said flash means to said power supply so as to store said electrical charge and responsive to said first switch device being in its said first state for decoupling said flash means from said power supply, a shutter mechanism actuatable between open and closed positions respectively effecting unblocking and blocking of the camera optical path so as to produce an exposure, means effective when said shutter mechanism is in its said open position for providing said trigger signal, means operable upon termination of an inhibit signal for actuating said shutter mechanism to its said open position and responsive to said trigger signal for actuating said shutter mechanism to its said closed position, charge sensing means for producing a charge level signal responsive to said flash means being charged to a given level, means responsive to said charge level signal and to said first switch device being in its said second state for producing an enable signal, and a second switch device settable from a first to a second state responsive to said enable signal and resettable to its said first state responsive to said flash trigger signal, said second switch device providing said inhibit signal when said second switch device is in its said first state and terminating said inhibit signal when said second switch device is in its said second state whereby in response to said trigger signal, said shutter mechanism is actuated to its said closed position and both said switch devices are reset to their said first states so as to automatically prevent further storing of said charge and operation of said shutter actuating means once said flash of light is produced.

5. An electronic flash unit for use with a camera, the camera having first, second, third, fourth and fifth camera terminals, means for coupling a supply of electrical power across said first and second camera terminals, a shutter mechanism actuatable for blocking and unblocking the camera exposure path to produce an exposure, light sensing means for controlling said shutter mechanism to produce said exposure in relation to scene light, means coupled to said third camera terminal for precluding operation of said light sensing means responsive to a first signal applied to said third camera terminal, means coupled to said fourth camera terminal for precluding actuation of said shutter mechanism responsive to a second signal applied to said fourth camera terminal, and means coupled to said fifth camera terminal for producing a flash trigger signal, said flash unit comprising means for coupling said flash unit to said camera, said coupling means including first, second, third, fourth and fifth flash terminals adapted for connection to said first, second, third, fourth and fifth camera terminals when said flash unit is coupled to said camera, a storage capacitor, a manually operable switch means for coupling said capacitor across said first and second terminals so as to charge said capacitor when said switch means is closed and said power supply is connected across said first and second camera terminals, means for coupling said third flash terminal to one of said first or second flash terminals so as to produce said first signal on said third flash terminal when said power supply is connected across said first and second camera terminals, means for sensing the stored charge of said capacitor and for producing said second signal on said fourth flash terminal until said stored charge reaches a predetermined level, means coupled to said capacitor and said fifth flash terminal for producing a flash of light when said trigger signal is provided on said fifth flash terminal.

* * * * *